(12) United States Patent
Sehgal et al.

(10) Patent No.: US 8,194,683 B2
(45) Date of Patent: Jun. 5, 2012

(54) TEREDO CONNECTIVITY BETWEEN CLIENTS BEHIND SYMMETRIC NATS

(75) Inventors: Amit Sehgal, Kirkland, WA (US); Mohit Talwar, Redmond, WA (US); Arpit Agarwal, Be, WA (US); Kamil Ustuntas, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 11/731,359

(22) Filed: Mar. 30, 2007

(65) Prior Publication Data
US 2008/0240132 A1    Oct. 2, 2008

(51) Int. Cl.
*H04L 12/28* (2006.01)
*H04L 12/56* (2006.01)

(52) U.S. Cl. ........ 370/401; 370/254; 370/255; 370/389; 370/392; 370/400; 370/410; 370/465; 370/466; 370/469; 370/474; 370/475; 709/220; 709/221; 709/222; 709/227; 709/228; 709/229; 709/238; 709/243; 709/244; 709/249

(58) Field of Classification Search .................. None
See application file for complete search history.

(56) References Cited

U.S. PATENT DOCUMENTS

| | | |
|---|---|---|
| 6,856,184 B2 | 2/2005 | Hidai |
| 7,031,328 B2 | 4/2006 | Thubert et al. |
| 7,363,378 B2 | 4/2008 | Holmes et al. |
| 2002/0141384 A1 | 10/2002 | Liu et al. |
| 2003/0065791 A1 | 4/2003 | Garg |
| 2003/0084162 A1 | 5/2003 | Johnson et al. |
| 2003/0206536 A1 | 11/2003 | Maggenti |
| 2003/0212772 A1 | 11/2003 | Harris |
| 2004/0128540 A1 | 7/2004 | Roskind |
| 2004/0133692 A1 | 7/2004 | Blanchet et al. |
| 2004/0139228 A1* | 7/2004 | Takeda et al. ............. 709/245 |
| 2004/0153858 A1 | 8/2004 | Hwang |
| 2004/0190549 A1* | 9/2004 | Huitema .................... 370/466 |
| 2004/0240468 A1 | 12/2004 | Chin |
| 2004/0252683 A1 | 12/2004 | Kennedy et al. |
| 2005/0005014 A1 | 1/2005 | Holmes et al. |
| 2005/0015427 A1 | 1/2005 | Guo |
| 2005/0100047 A1 | 5/2005 | Liu et al. |
| 2005/0105525 A1 | 5/2005 | Liu et al. |
| 2005/0105543 A1 | 5/2005 | Ikenaga et al. |
| 2005/0138166 A1 | 6/2005 | Blanchet |
| 2005/0165963 A1 | 7/2005 | Satzke |
| 2005/0243801 A1 | 11/2005 | Grubb |
| 2006/0050700 A1 | 3/2006 | Ravikumar et al. |

(Continued)

FOREIGN PATENT DOCUMENTS
WO    WO 2005/088466 A1    9/2005
(Continued)

OTHER PUBLICATIONS

Huitema, "RFC 4380, Teredo: Tunneling IPv6 over UDP through Network Address Translations (NATs)," Feb. 2006, Internet Society.*

(Continued)

*Primary Examiner* — Jae Y Lee
(74) *Attorney, Agent, or Firm* — Wolf, Greenfield & Sacks, P.C.

(57) ABSTRACT

Methods and systems for communicating between Teredo clients behind symmetric or restricted Network Address Translators.

20 Claims, 13 Drawing Sheets

U.S. PATENT DOCUMENTS

| | | | |
|---|---|---|---|
| 2006/0053485 | A1 | 3/2006 | Li |
| 2006/0072569 | A1 | 4/2006 | Eppinger |
| 2006/0120375 | A1 | 6/2006 | Ravikumar et al. |
| 2006/0182100 | A1* | 8/2006 | Li et al. .................. 370/389 |
| 2006/0182111 | A1 | 8/2006 | Wahl |
| 2006/0187912 | A1 | 8/2006 | Schwartz |
| 2006/0215684 | A1 | 9/2006 | Capone |
| 2006/0251088 | A1 | 11/2006 | Thubert |
| 2007/0061485 | A1 | 3/2007 | Horton et al. |
| 2007/0147263 | A1 | 6/2007 | Liao et al. |
| 2008/0209051 | A1 | 8/2008 | Holmes et al. |
| 2009/0006648 | A1 | 1/2009 | Gopalakrishnan et al. |

FOREIGN PATENT DOCUMENTS

| | | | |
|---|---|---|---|
| WO | WO 2006123218 | A2 | 11/2006 |

OTHER PUBLICATIONS

Huang et al. ("Enhancing Teredo IPv6 Tunneling to Traverse the Symmetric NAT,") May 2006, IEEE Communications letters, vol. 10, No. 5, IEEE.*

"IPv6 Features in the Advanced Networking Pack for Windows XP," Microsoft TechNet, downloaded from http://www.microsoft.com/technet/community/columns/cableguy/cg0403.mspx, dated Mar. 31, 2006, 8 pages.

Strater et al., "Seamless Mobility Between Home Networks and Cable Services," downloaded from http://broadband.motorola.com/ips/pdf/Seamless_Mobility.pdf, dated May 27, 2005, pp. 1-15.

"Network Infrastructure Device Implementer's Guide," downloaded from http://download.microsoft.com/download/9/c/5/9c5b2167-8017-4bae-9fde-d599bac8184a/Router_RG_WLAN.doc, dated Aug. 5, 2005, pp. 1-24.

NAT Behavioral Requirements for Unicast UDP draft-ietf-behave-nat-udp-08 http://www.ietf.org/internet-drafts/draft-ietf-behave-nat-udp-08.txt.

Overview of Network Address Translation (NAT) in Windows XP http://www.microsoft.com/technet/prodtechnol/winxppro/deploy/nattrnsv.mspx.

State of Peer-to-Peer(P2P) Communication Across Network Address Translators(NATs) http://www.ietf.org/internet-drafts/draft-ietf-behave-p2p-state-00.txt.

* cited by examiner

TEREDO CONNECTIVITY BETWEEN CLIENTS BEHIND SYMMETRIC NATS

BACKGROUND OF INVENTION

1. Field of Invention

The invention relates to network communication technologies and, more specifically, to mechanisms that enable IPv4 clients to communicate over an IPv6 network.

2. Discussion of Related Art

Computer networks allow computers and potentially any associated users to communicate electronically throughout the globe over a worldwide amalgamation of networks often referred to as the Internet. A common network protocol used to communicate over the Internet is called the Internet Protocol or "IP" for short. There are a number of different versions of IP including the common IP version 4 (herein also referred to as "IPv4") and the more recently-developed IP version 6 (herein also referred to as "IPv6"). Although IP is used on the Internet, it can be used in a variety of network contexts. IP is also often employed within local networks to connect computers.

In order for one computing system to communicate with another computing system over a particular network, it is important that each computing system be uniquely identified on that network. IPv4 provides a 32 bit addressing mechanism, which should allow for $2^{32}$ or approximately 4 billion different addresses. Practical considerations limit the number of IPv4 addresses to approximately 2 or 3 billion. While this may seem like an unlimited supply of addresses, the proliferation of the Internet and network devices throughout the globe have pushed or exceeded these address limits.

As the pool of available IPv4 addresses has shrunk, various systems have developed to allow multiple computers or devices to share a single external (i.e., directly accessible from the Internet) IP address. One such system is called "Network Address Translation." A Network Address Translation device (also known as a "Network Address Translator" or a "NAT") separates out a number of computing systems in a private network from the rest of the Internet. All computing systems on the Internet that are not in such a private network are required to have a unique IP address that is unique as compared to all other Internet-connected computing systems that are also not behind a NAT. The computing systems in each private network generally have an address that is unique to that private network, but not necessarily to the global Internet. The NAT then translates that private address into a globally unique IP address on the fly as each packet exits the private network through the NAT and into the global Internet. NATs typically alter packets using TCP and UDP port mapping to enable two-way traffic between external hosts and internal clients.

Accordingly, the NAT uses a limited number (potentially just one) globally unique address that it exposes to the Internet, while allowing the network devices that are behind the NAT to have a larger number of private network addresses that need not be globally unique throughout the Internet. The use of NATs therefore allows for a short term solution to the problem of there being a relatively limited number of IPv4 addresses available. Accordingly, IPv4 computing systems and NATs often work together.

Certain address blocks are reserved under IPv4 for NAT-internal use only. For example, the address blocks 10.0.0.0/8, 192.168.0.0/16, 172.16.0.0/12 are all defined in is RFC 1918 (entitled "Address Allocation for Private Internets") as reserved for "Private Internets." Generally, a NAT device routes packets to and from a reserved "private" IP address to a world-accessible "public" IP address.

IPv6, on the other hand, has a 128-bit addressing mechanism, which is sufficient to provide unique addresses for well into the anticipated future. Accordingly, the problem associated with a limited number of unique addresses under IPv4 may be addressed by reconfiguring the Internet to operate exclusively under IPv6 instead. Such a reconfiguration will likely occur over an extended period of time because there is significant infrastructural investment in the current Internet that is based on the IPv4 protocol. Furthermore, there is no one governing entity that controls the entire Internet. Accordingly, it is commonly accepted that the Internet needs to concurrently work with both IPv6 and IPv4, at least for the near future. In order to facilitate robust communication over the Internet, mechanisms have been developed that allow for IPv4 computing systems to communicate with IPv6 computing systems.

One mechanism often referred to as the "6to4" mechanism uses IPv6 packets as payload of IPv4 packets. When transitioning from an IPv4 network to an IPv6 network, the IPv6 packet is extracted and transmitted. When transitioning from an IPv6 network to an IPv4 network, the IPv6 packet is included as the payload of an IPv4 packet, and then the IPv4 packet is transmitted. Several problems exist with this 6to4 mechanism. Specifically, it may not work well when the IPv4 computing system that is to communicate is behind a NAT. Many NATs are not programmed to allow the transmission of arbitrary payload types. Accordingly, NATs may not permit communication of a payload in the form of an IPv6 packet. Even when the NAT permits such communication, the local address within the private network cannot be used in a 6to4 scheme. The 6to4 mechanism will work with a NAT if the NAT and 6to4 router are in the same physical box. However, there are many cases in which the NAT may not be easily upgradeable to include a 6to4 routing function.

"Teredo" is another protocol for transporting packets between nodes that support only IPv4 and nodes that support IPv6. Teredo is described in more detail in RFC 4380 (entitled "Teredo: Tunneling IPv6 over UDP through Network Address Translations (NATs)"). Teredo encapsulates IPv6 packets within IPv4 UDP datagrams, which most NATs can forward properly. Thus, IPv6-aware hosts behind NATs can be used as Teredo tunnel endpoints even when they don't have a dedicated public IPv4 address.

The Teredo implementation usually involves a client, a relay, and a server, although a relay is not always necessary. The Teredo client is a device on an IPv6 network. The client is assigned a unique IPv6 address that starts with a specific reserved prefix (2001:0000::/32).

A Teredo relay connects clients on an IPv6 network with an IPv4 network. The relay advertises a route to the Teredo IPv6 prefix to other IPv6 hosts in order to receive traffic from those hosts addressed to any Teredo client. The relay then forwards received packets a UDP datagram within an IPv4 packet. The relay also receives packets from Teredo clients addressed to native IPv6 hosts over UDP/IPv4 and forwards those packets into the native IPv6 network.

A Teredo server is used by a Teredo client both to determine whether the client is behind a NAT (and if so, to determine the type of NAT), and also to "punch holes" in the NAT so that the NAT will allow incoming traffic and forward it to the correct client. "Hole punching" involves initiating a connection from a host behind a NAT to a host external to the NAT so that the NAT will subsequently forward packets received from that external host back to the internal host. Some of the various types of NATs are described below.

A NAT needs to transmit packets both from an internal client to the external destination and in the opposite direction to facilitate communication. Accordingly, it needs some way to identify and match packets received from the outside with specific internal hosts. This is generally accomplished using port mapping. Port mapping can either be manually configured on the NAT, or can occur automatically. There are several different types of NATs that are commonly in use that can be categorized in terms of the system they use for port mapping. These definitions are set out in RFC 3489 (entitled "STUN—Simple Traversal of User Datagram Protocol (UDP) Through Network Address Translators (NATs)").

In the case of a "full cone" NAT, also known as "one-to-one" NAT, all requests that originate from the same internal IP address and port are mapped to the same external IP address and port. An external host can send a packet to the internal host by sending a packet to the mapped external address. For example, if the internal client has a local IP address of 192.168.1.5, and it attempts to connect to a web server on the Internet operating on port 80, the full cone NAT could modify the packet so the source IP address is the external IP address of the NAT device, for example, 151.207.245.67, and the source port could be mapped, usually to some unprivileged port, for example, 2000.

A "restricted cone" NAT is similar to a "full cone" NAT inasmuch as all internal requests from the same host to the same port number are mapped to the same external IP address and source port. Restricted cone NATs have the additional limitation that only external systems that have previously been sent packets are permitted to connect to the internal system. Thus, before an external system can connect to a client within the NAT, the client must have first initiated communication with that external system.

A "port restricted cone" NAT is similar to a "restricted cone" NAT with the additional limitation that external systems can only connect to clients within the NAT on the same port that the internal client used to connect to the external system.

An "address symmetric" NAT uses different external port mappings for outgoing packets to different remote endpoints, even when they originate from the same internal port mapping. The external port mapping differs both in the source IP address and source port. Furthermore, an address symmetric NAT permits incoming packets only from those remote endpoints (for both address and port) to which it has recently sent outgoing packets.

A "port symmetric" NAT is similar to an address symmetric NAT, except that the external mapping differs only in the source port but not the source IP address. For the purposes of this application, a "symmetric" NAT is either an address symmetric NAT or a port symmetric NAT. Accordingly, when a host is behind a symmetric NAT, only external hosts that have received packets from the internal host can send a packet back to the internal host.

For the purposes of this application, a "restricted" NAT is any NAT other than a full cone NAT.

Typically, port mappings established from outgoing packets expire after some period of time when there is no data flow in either direction over those port mappings.

Some NATs support a protocol called "UPnP" or "Universal Plug and Play." UPnP supports zero-configuration networking and automatic discovery, whereby a device can dynamically join a network, obtain an IP address, announce its name, convey its capabilities upon request, and learn about the presence and capabilities of other devices. In particular, clients connected to a UPnP-enabled NAT can use UPnP to discover, add, edit, or delete port mappings. A UPnP-enabled NAT thus allows a client to configure a static port mapping on the NAT, usually defined by a four-tuple consisting of the internal IP address, the internal port, the external port, and the protocol (TCP, UDP, etc.)

Typically, a UPnP-enabled symmetric NAT use unique port mappings for outgoing packets when communicating with different destinations, similar to a symmetric NAT. If a static UPnP port mapping has been configured on a UPnP-enabled symmetric NAT, however, incoming packets from all destinations will generally be accepted through the defined port mapping regardless of the source IP address and source port.

For NATs that will not allow an inbound connection through to an internal client before that internal client has first initiated an outbound connection, the technique of "hole punching" may be used by the internal client as an indirect way of instructing the NAT to forward inbound packets. Hole punching often involves a server other than the two clients that are attempting to communicate. For example, a Teredo client may establish a connection with a known Teredo server. The client may continuously send "bubble" packets to the server so that the NAT will forward packets from the server back to the client. If a second Teredo client, outside the NAT, needs to connect to the first Teredo client inside the NAT but packets from the second client cannot penetrate the NAT to reach the first client because of the NAT port-mapping behavior (as described above), the second client may be able to contact the Teredo server which in turn will send a message to the first client concerning the connection attempt. The first client can then send a bubble message to the second client. Depending on how the NAT is configured, it might then allow packets from the second client to be forwarded back to the first client.

IPv6 also provides mechanisms for a nodes on a network to discover each other's presence, to determine each other's link-layer addresses, and find routers and maintain reachability information about the paths to active neighbors. Many of these mechanisms are described in RFC 2461 (entitled "Neighbor Discovery for IP Version 6 (IPv6)"). In particular, a "Neighbor Solicitation" or "NS" message is sent by an IPv6 node to determine the link-layer address of a neighbor, or to verify that a neighbor is still reachable via a cached link-layer address. A "Neighbor Advertisement" or "NA" message is sent in response to a Neighbor Solicitation message. A node may also send unsolicited Neighbor Advertisement messages to announce a link-layer address change.

Neighbor Solicitation messages often include a nonce option. A nonce is a field containing a random number selected by the sender of the message. A Neighbor Advertisement message that is sent in response to a Neighbor Solicitation message may include the same nonce value. This technique provides a means for the original sender of the Neighbor Solicitation message to match the response to the original query.

SUMMARY OF INVENTION

This Summary provides an illustrative context for aspects of the invention, in a simplified form. It is not intended to be used to determine the scope of the claimed subject matter. Aspects of the invention are described more fully below in the Detailed Description.

In one aspect of the invention, two or more IPv6-aware clients using Teredo are located behind the same NAT. Methods and systems are described for allowing these clients to communicate.

In another aspect of the invention, a Teredo client detects the type of NAT it is behind. Methods and systems are provided that enable this detection to occur more rapidly.

The various methods and systems described herein may be implemented separately or combined in various ways.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to one embodiment, the invention may be implemented in a network environment such as the Internet. The Internet includes an IPv6 Internet. The IPv6 Internet includes a number of devices, each with an IPv6 address. These IPv6 addresses are generally expressed as eight groups of four hexadecimal digits. For example, 2001:0db8:0000: 0000:0000:0000:1428:57ab is a valid IPv6 address.

The Internet also includes an IPv4 Internet. The IPv6 Internet includes a number of devices, each with an IPv4 address. These IPv4 addresses are generally expressed as four groups of digits, where each digit is between 0 and 255. For example, 151.207.245.67 is a valid IPv4 address. Because the IPv6 Internet has a much larger addressing space, it has the potential to provide unique addresses for a much larger number of devices than the IPv4 Internet.

The IPv4 Internet includes at least one server and at least one relay that are each capable of communicating over both the IPv4 Internet and the IPv6 Internet. In one embodiment, the server and relay are each implemented according to the Teredo specification as a Teredo server and a Teredo relay respectively. The server and relay facilitate communications between clients on the IPv4 Internet and clients on the IPv6 Internet.

The IPv4 Internet also includes a private network that is behind a network address translation system (also referred to herein as a "NAT"). The NAT assigns a private IPv4 address to each client in its private network. That private IPv4 address is unique to the private network, but is not necessarily unique to the Internet at large. RFC 1918 describes certain IPv4 addresses that are reserved for such private networks. For example, 192.168.1.5 is a valid private IPv4 address.

In one embodiment, an IPv4 client that is on a private network behind a NAT sets up a connection with an IPv6 client on the IPv6 Internet. The IPv4 client that is behind the NAT first obtains an IPv6 address for itself. Typically, the first 32 bits of that client's IPv6 address are set to the reserved Teredo prefix, 2001:0000. The next 32 bits embed the primary IPv4 address of the Teredo server with which the client will communicate. The next 16 bits define flags. In some implementations, these bits indicate whether the Teredo client is located behind a cone NAT or not. The next 16 bits encode the port number that is mapped by the NAT to the internal client. These bits will typically be inverted from the actual port number. Finally, the remaining 32 bits encode the public IPv4 address of the NAT. These bits are also generally inverted.

IPv6 Teredo Address Detection

Figure 1:
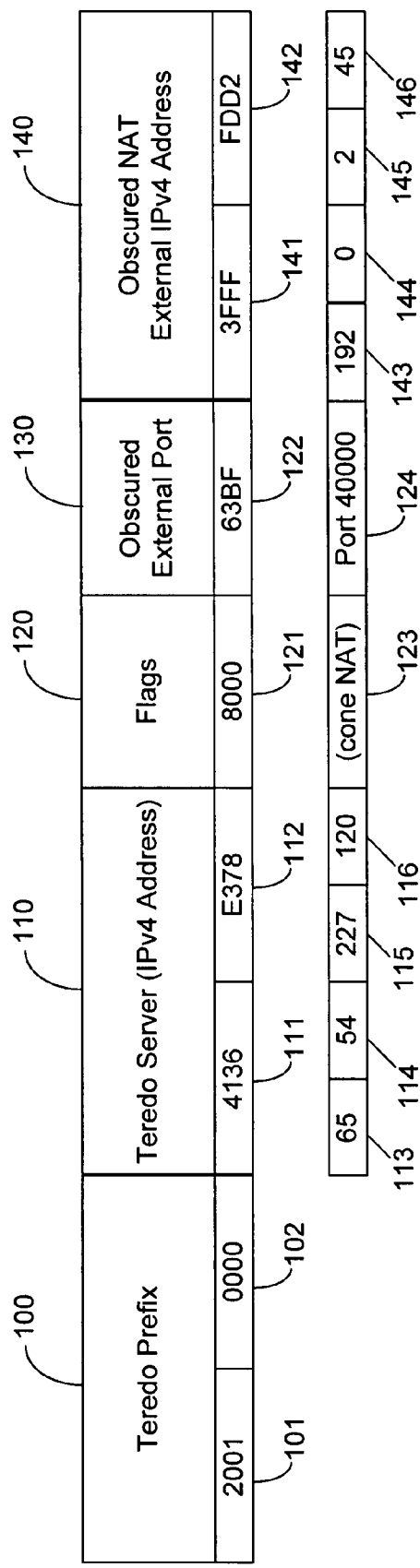
FIG. 1 is a schematic depiction of a Teredo IPv6 address.

FIG. 1 depicts an example IPv6 Teredo address of a client on a private network behind a NAT. The IPv6 address includes eight groups of four hexadecimal digits. The Teredo Prefix 100 includes the first two groups of hexadecimal digits (or sixteen bits); in this case, the IPv6 address uses the reserved prefix 2001:0000 101-102 to indicate that the address is a Teredo address. The next sixteen bits encode the IPv4 address of the Teredo Server 110. The IPv4 address in this example is 65.54.227.120 (113, 114, 115, 116), which is equivalent to 4136E378 111-112 in hexadecimal. The next eight bits encode various flags 120. In the depicted example, the first bit is set, thus resulting in the hexadecimal code 8000 121, indicating that the client is behind a cone NAT 123. The following eight bits encode the external port that the NAT has mapped to the client 130. This port number is obscured with the operator xor FFFF, thus port 40000 124 is encoded as 63BF 122. Finally, the latest sixteen bits of the IPv6 address encode the external IPv4 address of the NAT device on the network 140. These digits are also obscured by the xor operator with FFFF, thus the example IPv4 address 192.0.2.45 (143, 144, 145, 146) become the hexadecimal code 3FFF:FDD2 141-142. Thus, the final address in this figure for the Teredo client behind a NAT device is 2001:000:4136:E378:8000:63Bf: 3FFF:FDD2 (101, 102, 111, 112, 121, 122, 141, 142).

In order to determine its full Teredo IPv6 address, in some embodiments, the client behind the NAT first connects with a Teredo server. Since the NAT translates the source IP address and the source port as it forwards packets from the internal host, the Teredo server will receive the request as appearing to originate from the translated address. It can then respond back to the Teredo client with the information that the client needs to construct its complete IPv6 address.

Figure 2A:
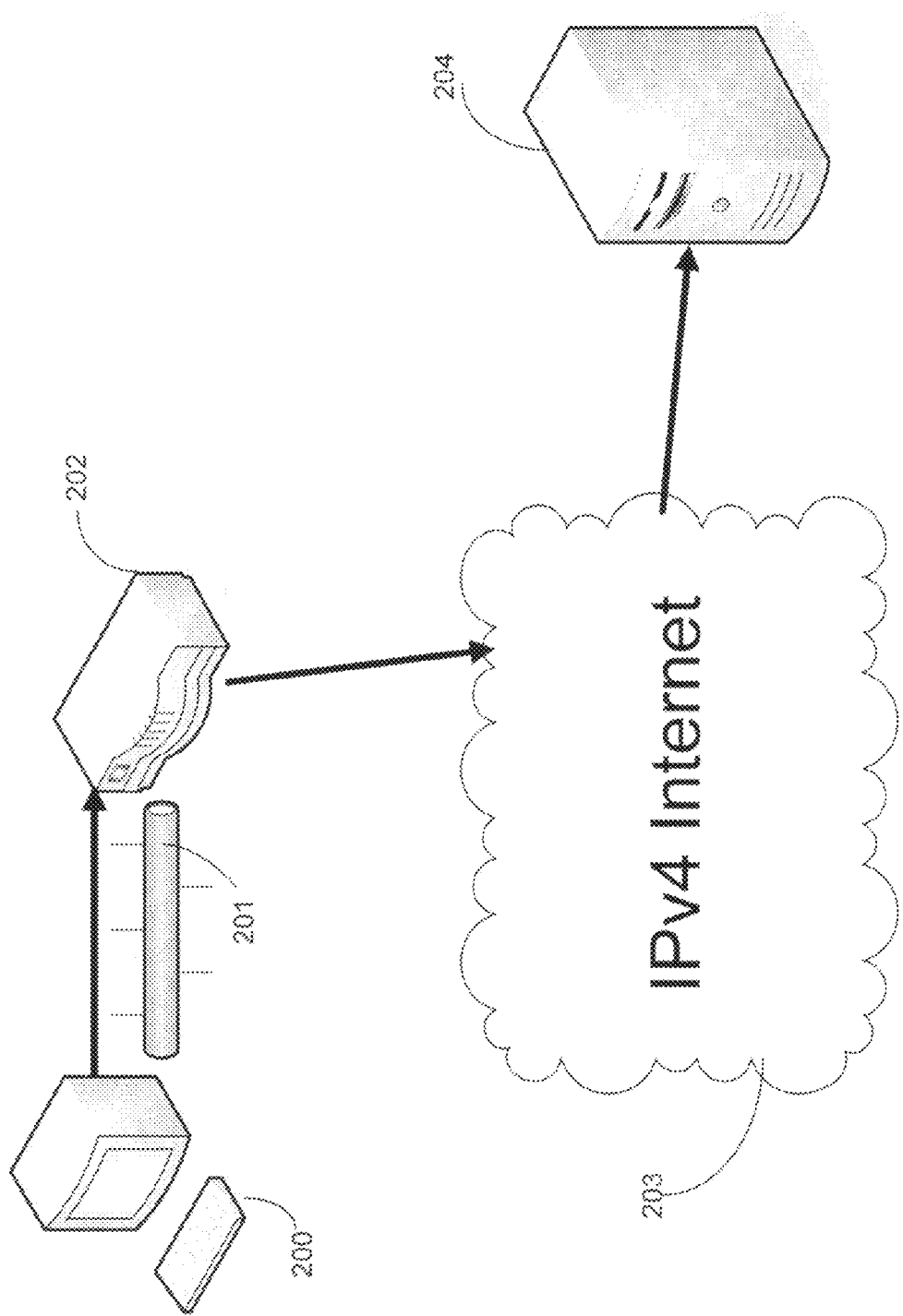
FIG. 2A depicts a Teredo client that is connected to the IPv4 Internet through a NAT device sending a packet to a Teredo server.
Figure 2B:
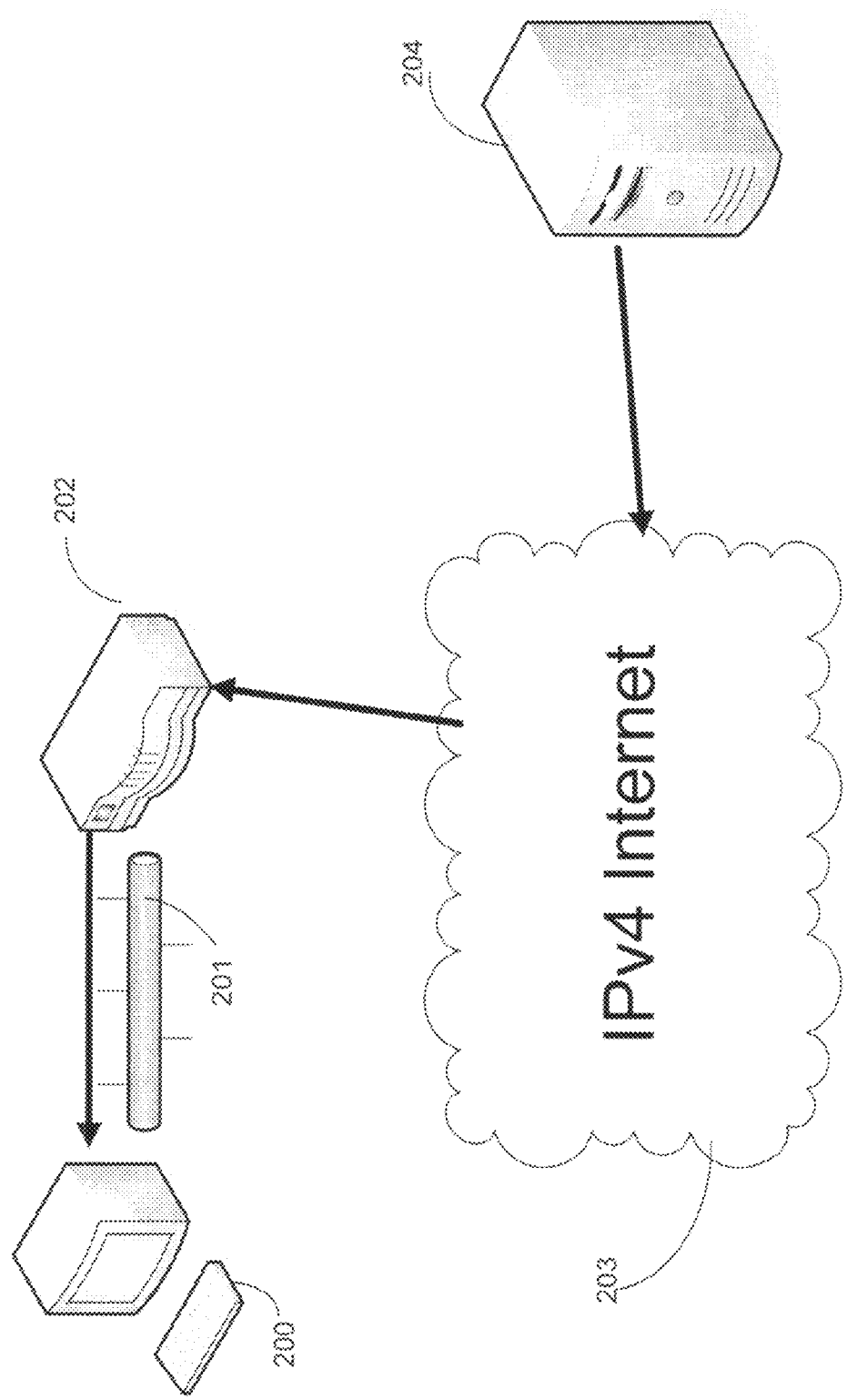
FIG. 2B depicts a Teredo server sending a message through the IPv4 Internet back to a Teredo client through a NAT device.

An example of the process of Teredo IPv6 address detection is illustrated in FIG. 2A and FIG. 2B. In FIG. 2A, the Teredo client 200 sends an IPv4 packet to a Teredo server 204. The client 200 is connected to a NAT 202 through an Ethernet connection 201. In some embodiments, a UDP packet is sent to port 3544 for the purposes of address detection. In some embodiments, this packet is called a "Router Solicitation" (or RS) message. One implementation of the Router Solicitation message is described in RFC 2461 (entitled "Neighbor Discovery for IP Version 6 (IPv6)"). The packet is sent from the client 200 to the NAT 202 through the Ethernet connection 201, at which point the NAT 202 modifies the source IP address to be the external IPv4 address of the NAT 202. The NAT 202 also modifies the source port and adds the new source port to a routing table so that later-received incoming packets will be properly forwarded back to the internal client 200. The NAT 202 then forwards the packet to the Teredo server 204 through the IPv4 Internet 203.

As shows in FIG. 2B, the Teredo server 204 then sends a return packet back to the internal client 200, again through the IPv4 Internet 203. The return packet includes information that can be processed by the internal client 200 to determine the external IP address of the NAT 202 as well as the source port of packets that were forwarded from the internal client 200 to the server 204 through the NAT 202. In some embodiments, the packet is called a "Router Advertisement" (or RA) message, also defined in RFC 2461. When the return packet arrives at the NAT 202, the NAT forwards the packet back to the client 200 on the basis of the destination port. Once this process is complete, the internal client 200 will have all the information it needs to form a synthetic Teredo IPv6 address, as shown in FIG. 1. That synthetic address can then serve as a mechanism for reaching the internal client 200 from the IPv6 Internet and vice-versa.

NAT-Type Detection

In addition to informing the client 200 of its external IP address and source port, the Teredo server 204 can be used by the client 200 in some embodiments to determine the type of NAT 202 that the client 200 is behind. In one embodiment, the server 204 has two distinct IPv4 addresses. In another embodiment, two different servers, each with its own IPv4 address, can also be used by the client 200 to detect the type of NAT 202 it is behind. Once the server 204 receives the initial packet from the client 200, the server 204 can attempt to reach the client 200 using a different source IPv4 address than the destination IPv4 address of the initial request from the client 200. If the packet from the different IPv4 address successfully reaches the client 200, then the client 200 can assume that all traffic to its source port will be forwarded by the NAT 202, regardless of the origin IP address. The client 200 can conclude that the NAT 202 is a full cone NAT, and set the flags 121 in its Teredo address accordingly. If the return packet does not arrive, then the NAT 202 may be a port- or address-restricted NAT, or a symmetric NAT, in which case external hosts will not be able to reach the internal client 200 without additional measures described in more detail below.

Teredo Behind Symmetric NATs Using UPnP

Many commercially available routers support the UPnP protocol described above. For example, experiments show that the Netgear WGT 624v3, Netgear WPN 824v2, Netgear 614, and Linksys WRT55AG routers all support UPnP, although the invention is not limited to being practiced on these routers.

According to some embodiments, a UPnP-capable router may be shipped with the UPnP functionality disabled. In these cases, in accordance with some aspects of the invention, it may be necessary to enable the UPnP functionality on the router. This enablement could be performed either manually by the user, or automatically by software, or by any other method.

In some implementations, clients behind a symmetric NAT are not able to use Teredo to communicate with clients behind other symmetric or port-restricted NATs. This is because when a client behind a symmetric NAT sends direct packets to a peer, the NAT uses a different port mapping than when communicating with a Teredo server. If the peer is behind a port restricted NAT or a symmetric NAT, then the peer's NAT will not allow packets through as the peer's NAT has not yet forwarded a packet from the peer to the client and thus has not established the necessary port mappings. It also may not be possible for a client behind a symmetric NAT to determine the port mapping used by its own NAT when communicating with a given peer.

Figure 3:
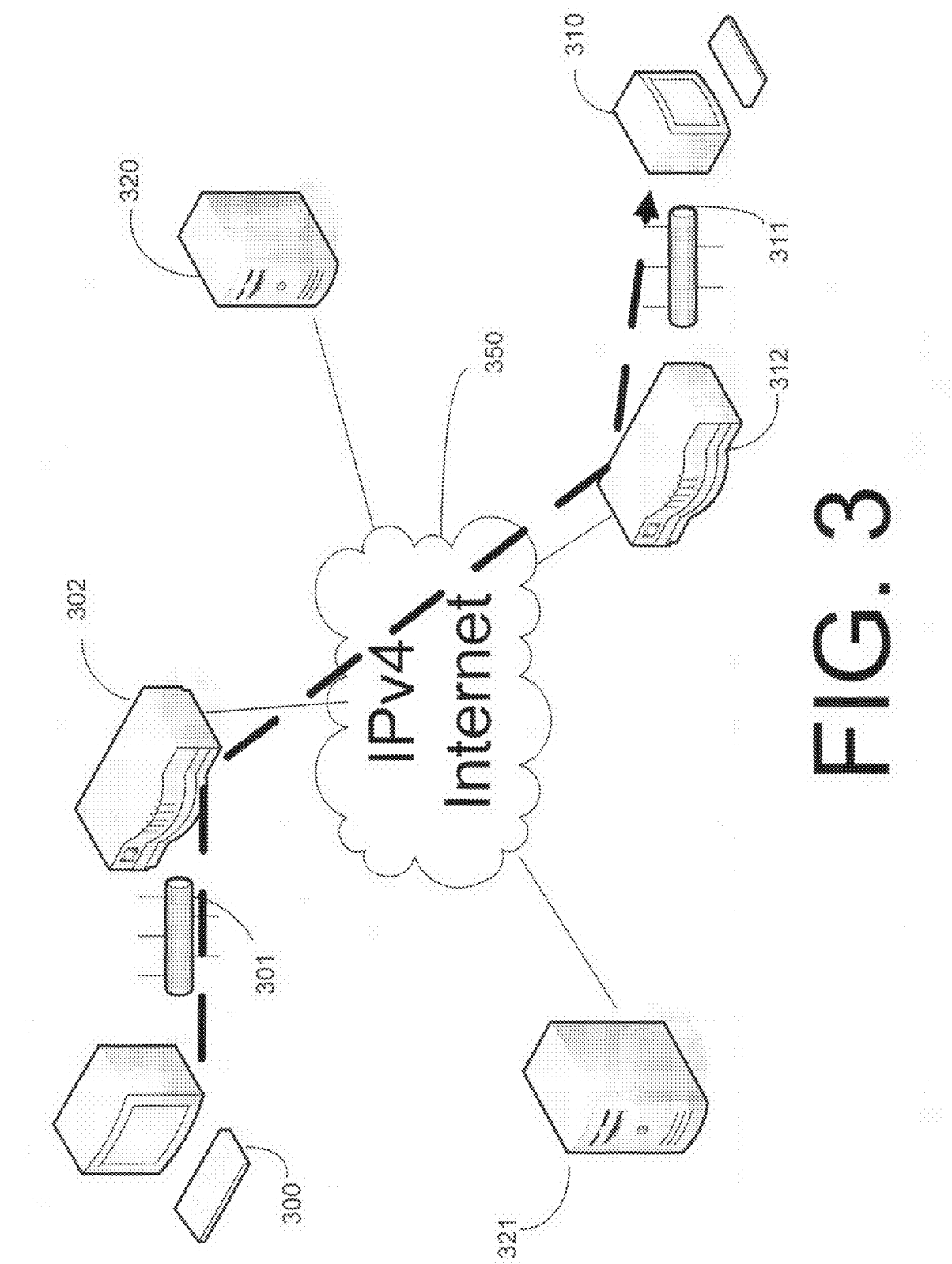
FIG. 3 depicts two Teredo clients communicating through the IPv4 Internet.

In FIG. 3, a first Teredo client 300 is depicted communicating with a second Teredo client 310. In this example, both the first client 300 and the second client 310 are each behind a full cone NAT, respectively a first cone NAT 302 and a second cone NAT 312. The internal connection (between the client and the NAT) is depicted in this example as an Ethernet connection, a first Ethernet connection 301 for the first client 300, and a second Ethernet connection 311 for the second client 310. The first client 300 discovers the information it needs to construct its Teredo address from a first Teredo server 320, as described above. The second client 310 likewise discovers the information it needs from a second Teredo server 321. (It is also possible that both clients detect the Teredo address information from the same server.) If both the first NAT 302 and the second NAT 312 are full cone NATs, the first client 300 will be able to communicate directly with the second client 310 through the IPv4 Internet 350 without the need for any relay or bubble packets.

Figure 4:
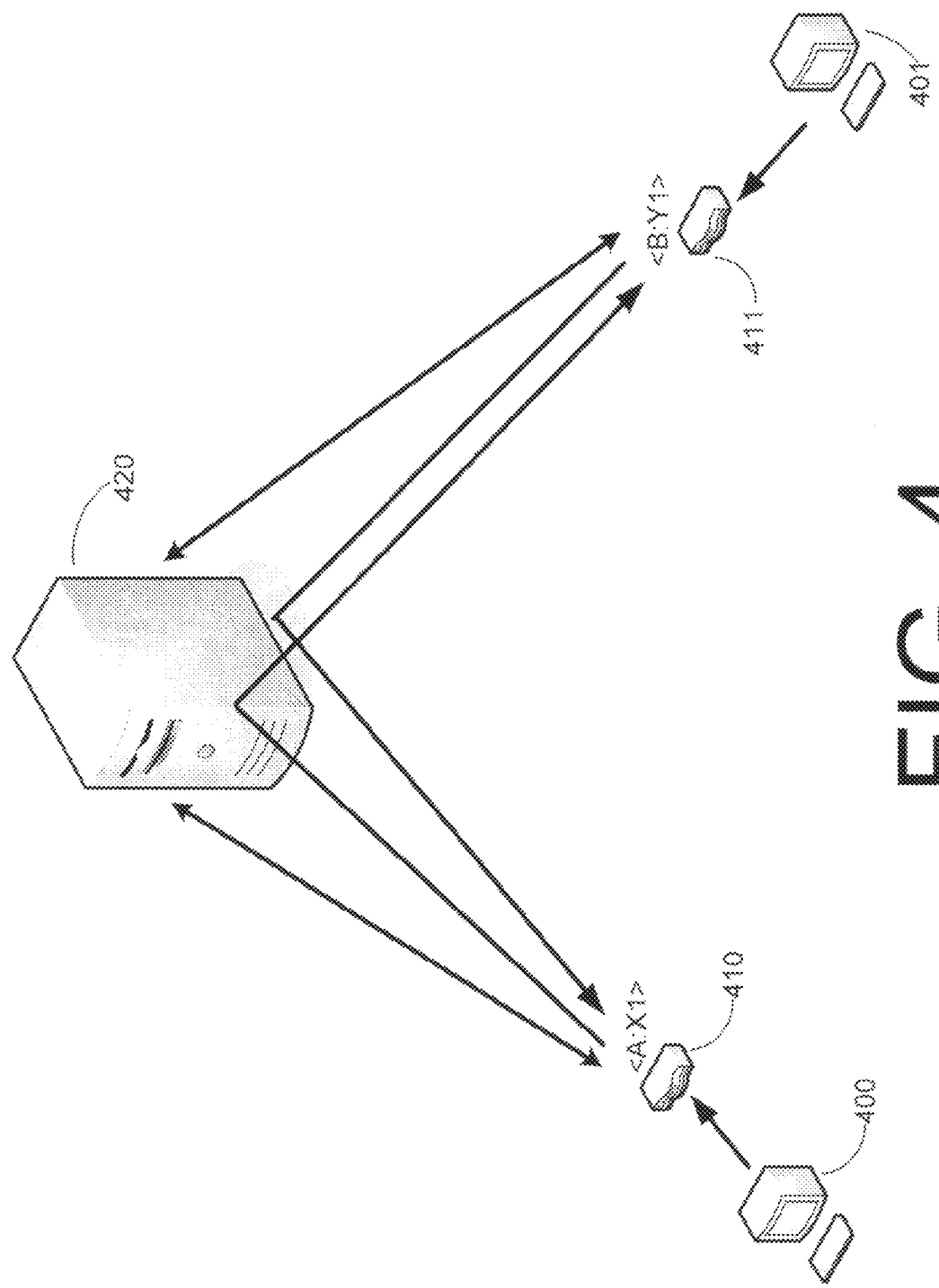
FIG. 4 depicts two Teredo clients behind symmetric NATs that are unable to communicate.
Figure 5:
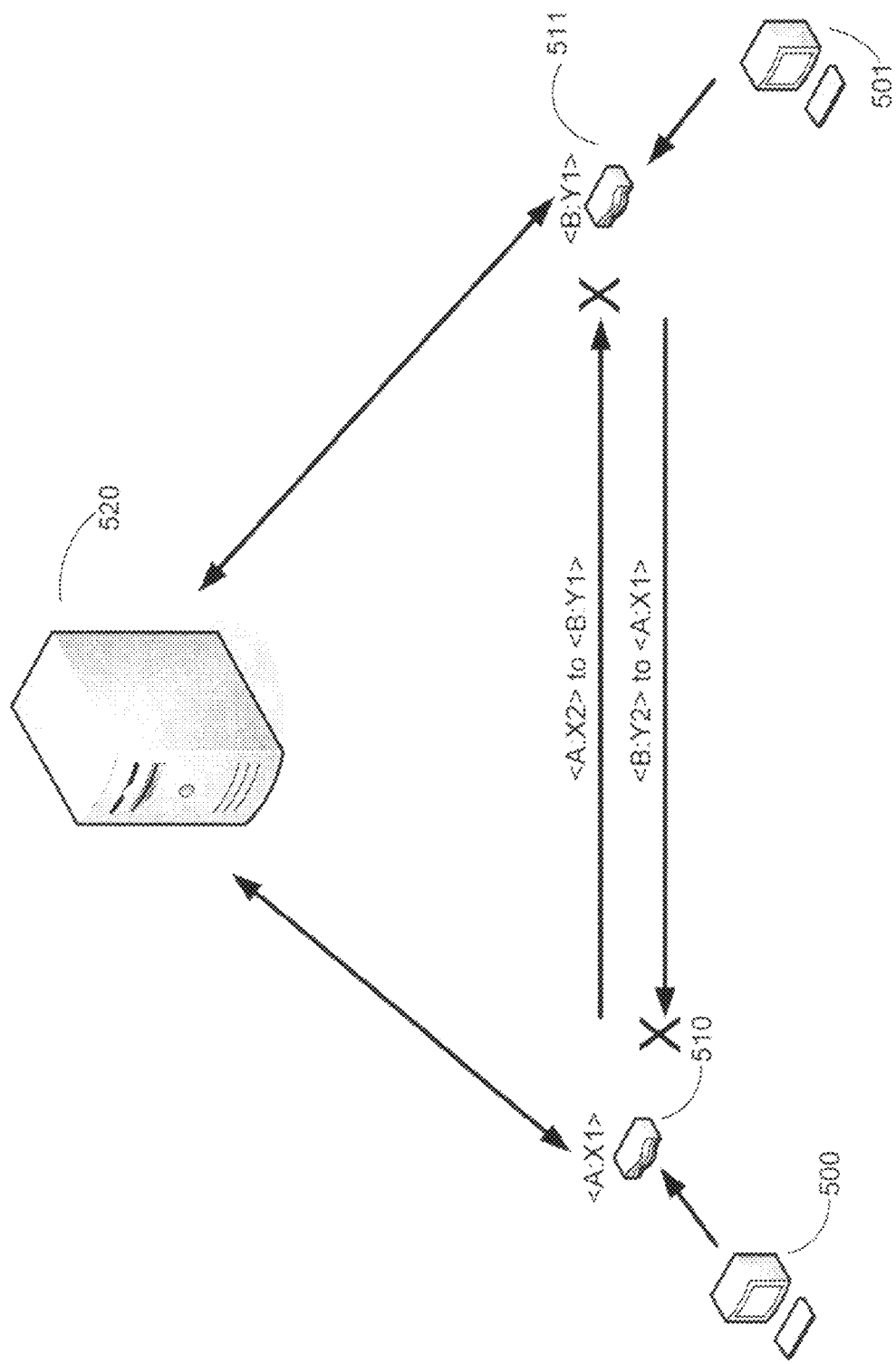
FIG. 5 depicts two Teredo clients behind symmetric NATs that are unable to communicate.

FIGS. 4 and 5 depict a situation where two clients cannot communicate with Teredo where each client is behind a symmetric NAT. First, FIG. 4 shows two clients, each behind a symmetric NAT, communicating through a Teredo server. A first client 400 is shown behind a first symmetric NAT 410. The symmetric NAT 410 establishes a port mapping for communication with the Teredo server 420, shown in FIG. 4 as <A:X1> where A represents the external IP address of the symmetric NAT 410 and X1 represents the port mapping selected for communication on a specific port to the Teredo server 420. Thus, the Teredo server 420 is able to communicate with the first client 400 by sending packets to the symmetric NAT 410 at port mapping <A:X1>, which the symmetric NAT 410 forwards to the internal Teredo client 400. Similarly, a second client 401 is behind a second symmetric NAT 411. The second symmetric NAT 411 maps communications from the second client to the Teredo server 420 to a second port mapping, <B:Y1>. Accordingly, both clients 400 and 401 are able to communicate in both directions with the Teredo server 420, and are also able to send each other indirect packets through the Teredo server as shown in the figure. Since each client has already sent packets to the Teredo server 420, they will each accept packets that have been forwarded through the Teredo server 420, even though both clients are behind symmetric NATs.

In FIG. 5, both Teredo clients 500 and 501 attempt to communicate directly with each other through the port mapping embedded in their respective Teredo addresses. Because both clients are behind symmetric NATs, however, they are unable to communicate. The mappings A:X1 and B:Y1 were established between each client and the Teredo server, and because the clients are behind symmetric NATs, the NATs do not forward packets to those mappings where the source IP address and port are other than the server. Accordingly, the clients are not able to enter into direct communication via the Teredo protocol.

Figure 6:
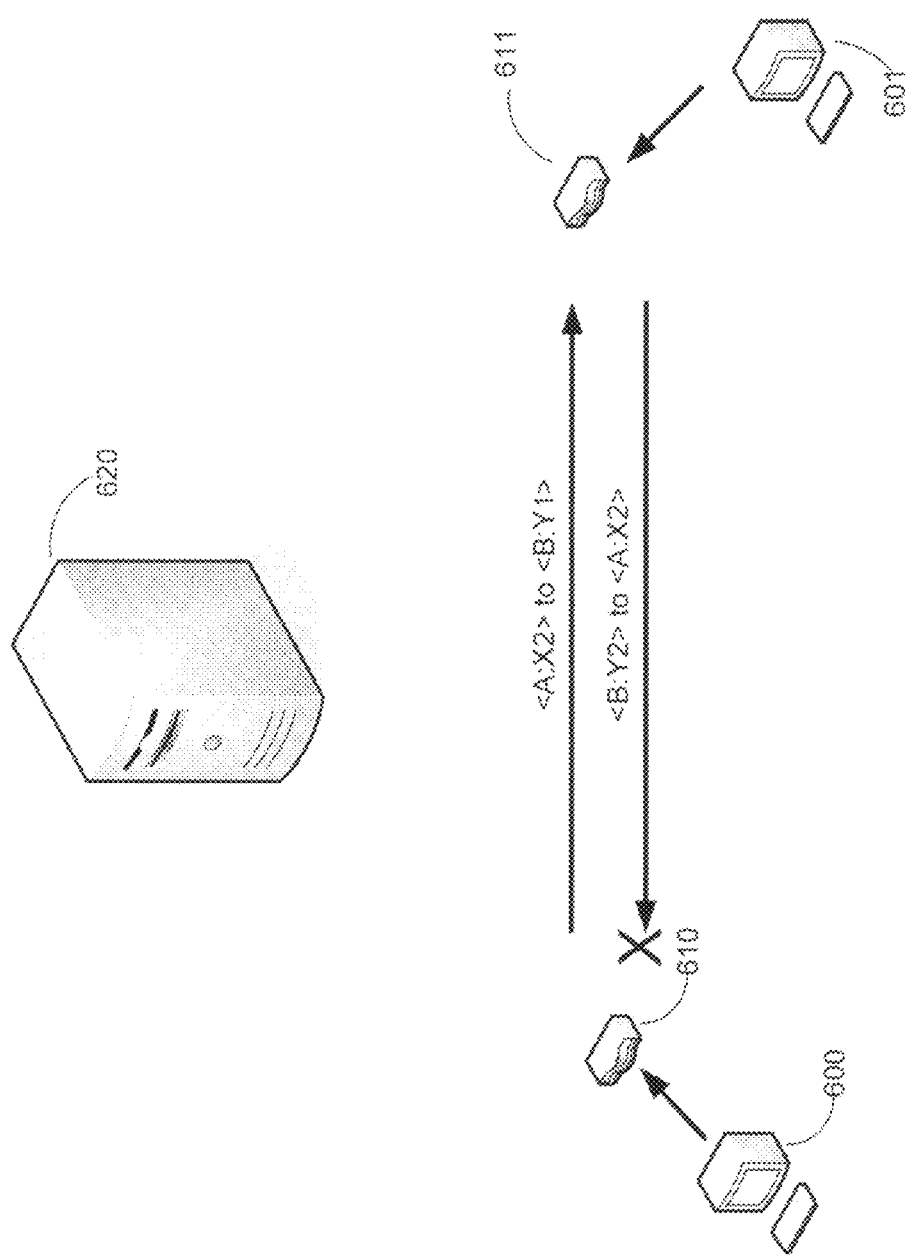
FIG. 6 depicts two Teredo clients each behind a UPnP-enabled NAT that are unable to communicate.

FIG. 6 depicts two Teredo clients 600 and 601, each behind a symmetric NAT which is UPnP enabled 610 and 611 respectively. Even where both NATs are UPnP enabled, however, they may not be able to communicate. When a symmetric NAT receives a direct bubble packet from a Teredo peer, it will record the port mapping from which the direct bubble was sent. For example, as depicted in FIG. 6, the second symmetric NAT 611 will receive packets coming directly from the first Teredo client 600 through the first symmetric NAT 610 as originating from the port mapping <A:X2>. Since the peer is behind a symmetric NAT, however, the new mapping learned will be different from the mapping encoded in the client's Teredo address. Thus the second client 601 will attempt to send direct bubbles to the new port mapping <A:X2> which was learned from the direct bubble received from the first client 600. The packet will not be forwarded by the first symmetric NAT 610, however, because it will originate from a different source port (<B:Y2>) than the destination port (<B:Y1>) of the earlier-sent packet.

According to one embodiment of the invention, a Teredo client behind a UPnP-enabled symmetric NAT must decide whether to communicate with an external peer using the port mapping observed from the direct bubble or to continue using the mapping embedded in the Teredo address. In the system described above and depicted in FIG. 6, only the mapping learned from the direct bubble is used, and thus communication is not possible. One possible embodiment would be to explicitly communicate information from the peer regarding whether it is behind a UPnP-enabled symmetric NAT. This embodiment would likely require a change to the message format. In another embodiment, the client relies on information available in the direct bubbles to deduce whether it should communicate with the peer's direct bubble port mapping or with the port mapping embedded in the peer's Teredo address.

In one embodiment, a Teredo client determines whether it is behind a UPnP-enabled NAT by attempting to add a static port mapping using the UPnP standard protocol. If the attempt is successful, the client can conclude that it is behind a UPnP-enabled NAT. Furthermore, when a client receives a direct bubble from a peer, it can deduce from the direct bubble port mapping and the Teredo-address-embedded port mapping whether the peer is behind a symmetric NAT or a restricted NAT. If the peer is behind a symmetric NAT then the direct bubble port mapping and the Teredo-address-embedded port mapping would be different. If the peer is behind a restricted NAT, then the direct bubble port mapping and the Teredo-address-embedded port mapping would be the same.

Thus, according to some embodiments, if the Teredo client determines that the peer is behind a symmetric NAT and is aware that the Teredo client itself is behind a UPnP-enabled symmetric NAT, it should use the Teredo-address-embedded port mapping to communicate with the peer. If the client determines that it is behind a UPnP-enabled symmetric NAT and the peer is behind a restricted NAT, then it should use the port mapping learned from the direct bubble. Finally, if the client is not behind a UPnP-enabled symmetric NAT, then communication processes would continue according to standard Teredo practice.

Figure 7:
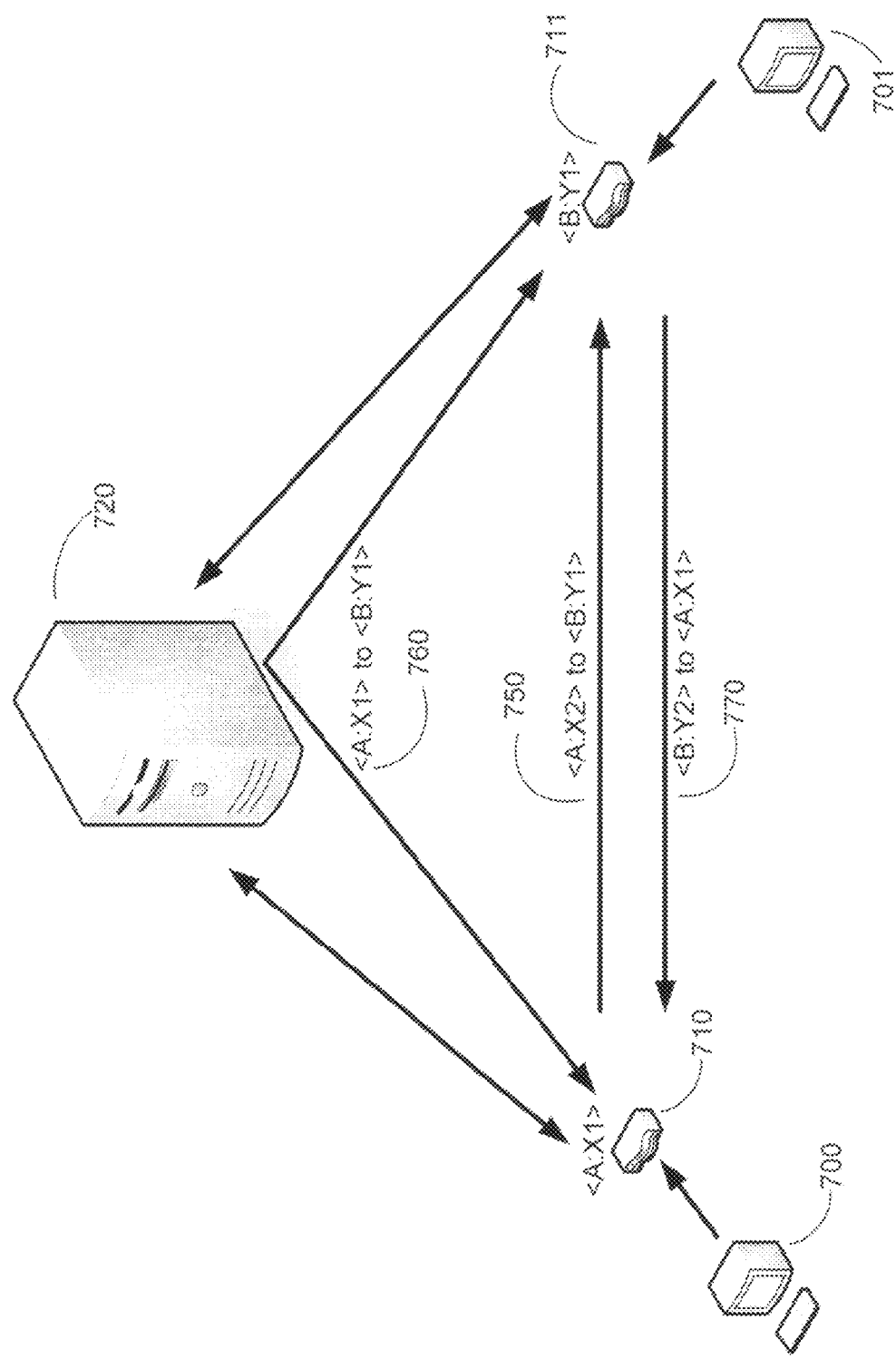
FIG. 7 depicts some aspects of some embodiments of the invention wherein two Teredo clients are each behind UPnP-enabled symmetric NATs.
Figure 8:
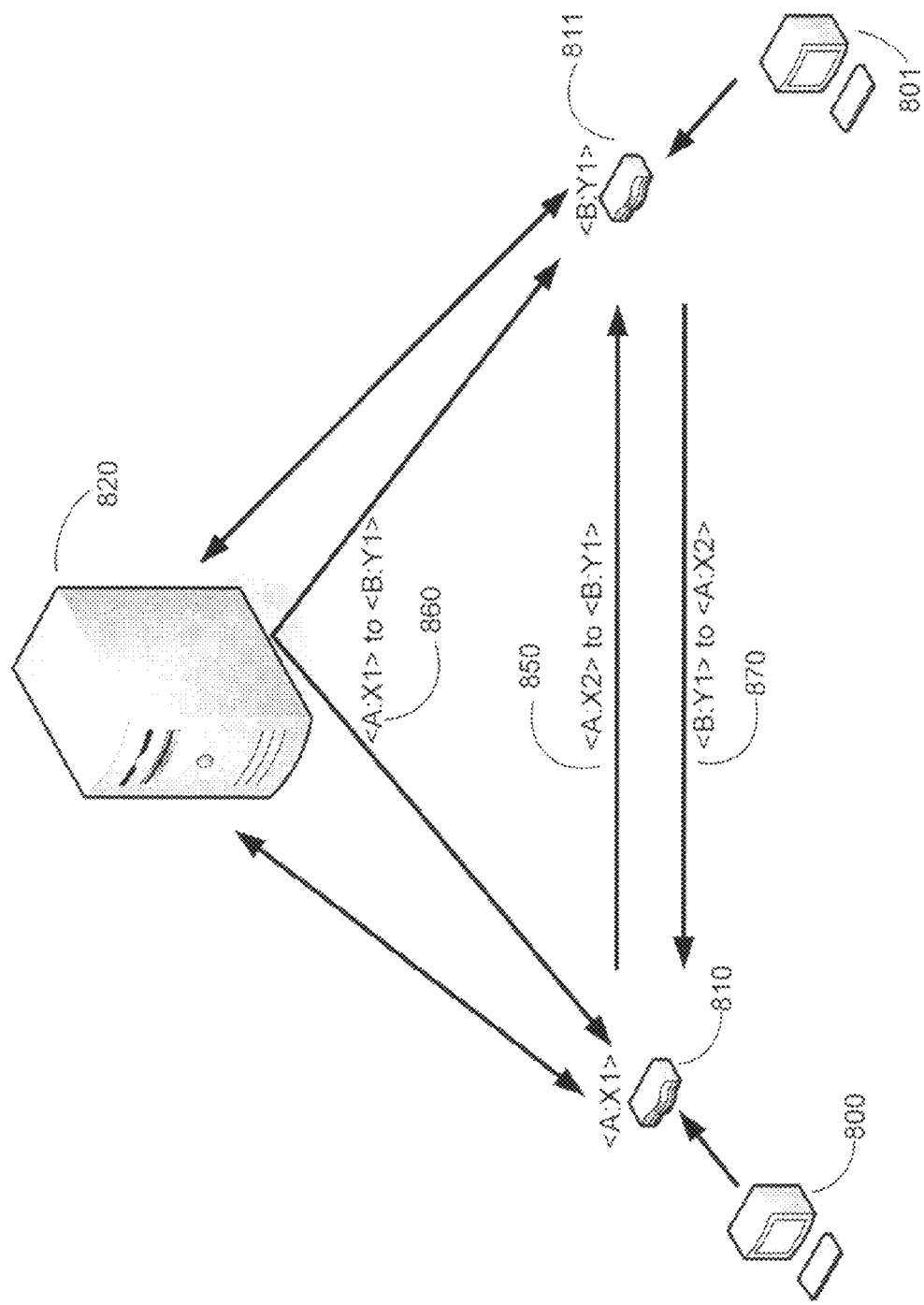
FIG. 8 depicts some aspects of some embodiments of the invention wherein one Teredo client is behind a UPnP-enabled symmetric NATs and the other client is behind a UPnP-enabled port-restricted NAT.

Client Behind UPnP-Enabled Symmetric NAT Communicating with Another Client Behind a UPnP-Enabled Symmetric NAT FIGS. 7 and 8 illustrate some aspects of some embodiments of the invention. FIG. 7 shows two Teredo clients 700 and 701, each behind a symmetric UPnP-enabled NAT 710 and 711 respectively. Both clients communicate with a Teredo server 720, although the invention is not limited to the situation where both clients are communicating with the same Teredo server. The first NAT 710 has an external IP address A. When the first NAT 710 communicates with the Teredo Server 720 (i.e., by forwarding a packet from the first Teredo client 700), the NAT 710 creates a port mapping <A:X1> particular to communications with the server 720. Thus the server is able to send packets pack to the first client 700 at the <A:X1> port mapping so long as the source port is the same as the destination port of packets sent from the client 700 to the server 720. Similarly, the second Teredo client 701 can communicate with the Teredo server 720 through a symmetric UPnP-enabled NAT 711 using the port mapping <B:Y1>.

The second client 701 can detect directly that it is behind a UPnP-enabled symmetric NAT 711 as described above. When a first 750 is received where the direct port mapping <A:X2> is different from the Teredo-address-embedded port mapping <A:X1>, the second client 701 can conclude that the first client 700 is behind a symmetric NAT and thus will use the Teredo-address-embedded port mapping <A:X1> to send a direct bubble back 770.

The first client 700 then receives a direct bubble 770 where the direct port mapping <B:Y2> is different from the Teredo-address-embedded port mapping <B:Y1>. Thus the first client 700 can also determine that the second client 701 is behind a symmetric NAT 711 while it itself is behind a UPnP-enabled symmetric NAT 710. Thus, it continues to use the Teredo-address-embedded port mapping <B:Y1> to communicate with the second client 701. In this example, the two Teredo clients, both behind UPnP-enabled symmetric NATs, are thus able to communicate directly.

Client Behind UPnP-Enabled Symmetric NAT Communicating with a Client Behind a UPnP-Enabled Port-Restricted NAT FIG. 8 depicts a similar embodiment to that shown in FIG. 7, except in this case the second client 801 is behind a UPnP-enabled port-restricted NAT 811 rather than a symmetric NAT as in FIG. 7. According to one embodiment, communication between the two Teredo clients 800 and 801 is possible. When the second client 801 receives a direct bubble 850 from the first client 800, the second client 801 will detect that the port mapping for the direct bubble 850 <A:X2> is different from the Teredo-address-embedded port mapping for the first client <A:X1>. The second client 801 can also detect that it is behind a UPnP-enabled restricted NAT 811. Thus, it learns the direct port mapping of the first client 800 and sends direct bubbles to <A:X2> 870.

When the first client 800 receives direct bubbles 870 from the second client 801 it detects that the direct port mapping and the Teredo-address-embedded port mapping are the same, namely <B:Y1>. Accordingly, it continues to send direct bubbles to <B:Y1> and thus communication is established between the two clients.

Client Behind Non-UPnP-Enabled Symmetric NAT Communicating with a Client Behind a UPnP-Enabled Port-Restricted NAT Where a client behind a symmetric NAT that is not UPnP-enabled attempts to communicate with a client behind a UPnP-enabled port-restricted NAT, communication is possible in accordance with some embodiments of the invention. In this example, communication would be achieved as described above in connection with FIG. 8, with the only difference being that the first client 800 is now behind a non-UPnP-enabled symmetric NAT 810 (i.e., just a symmetric NAT). Otherwise, the same communication methods described above can be used, relying only on the UPnP capabilities of the second NAT 811.

Communication Between Teredo Clients Behind NATs without UPnP Support

In other embodiments, to allow connectivity between Teredo clients when one of the clients is behind a symmetric NAT without UPnP support, the address check between the Teredo address and the external address may be relaxed. In one embodiment, nonces are used to verify a client whose Teredo address does not match the external mapped address. Below are described several possible qualification procedures to determine whether clients behind NATs can communicate over the Teredo protocol.

1. To detect connectivity between two Teredo clients that are behind NATs, a mechanism similar to the link-layer Neighbor Discovery mechanism of the IPv6 protocol may be used, relying on Teredo bubble packets. Two types of bubble packets may be used. First, a "direct bubble" is an IPv6 header packet with the possible addition of a nonce, received directly from another Teredo client or native IPv6 client. Second, an "indirect bubble" is an IPv6 header packet with the possible addition of a nonce, received indirectly through a Teredo server.

2. In some embodiments, when a Neighbor Solicitation message is received, a client generates two packets: (1) a rate-limited direct bubble to the sender of the message and (2) an indirect bubble to be sent to the sender of the message through a Teredo server. The rate-limited direct bubble may be used to determine if the port mapping on the destination client is already open and configured to forward packets to the internal client. The direct bubble may also cause a port mapping on the client's NAT to be opened under the assumption that the destination's Teredo address contains the correct mapped address. The indirect bubble informs the destination client that a Teredo client is attempting to establish connectivity to the destination and is attempting to verify the port mapping embedded in the Teredo address.

3. When a client receives a Neighbor Advertisement message, two packets may also be generated: (1) a direct bubble and a rate-limited indirect bubble. The direct bubble, similar to the Neighbor Solicitation case, is used to open a port mapping on the client's local NAT and to test connectivity to the destination. The indirect bubble similarly may be used to inform the destination that the source is attempting to directly contact the destination and that the destination must take appropriate steps to open a port mapping on its NAT to be contacted.

4. When a client receives a direct bubble, in some embodiments, it sends a Neighbor Advertisement message to its TCP/IP stack.

5. When a client receives an indirect bubble, in some embodiments, it sends a Neighbor Solicitation message to its TCP/IP stack.

6. In some embodiments, the indirect bubble includes a newly-generated cryptographic nonce. In other embodiments, a nonce is only generated during the connectivity-detection phase. In these embodiments, a direct bubble sent out in response to an indirect bubble containing a nonce will also contain the same nonce.

In the example rules provided in 1-6 above, the qualification procedure may also rely on the timeout mechanism built into the neighbor discovery mechanism of the stack.

These qualification procedures will now be described with respect to two example scenarios. First, the procedures will be applied to the case of a Teredo client behind a symmetric NAT communicating with a Teredo client behind a restricted NAT. Second, an example will be given of a Teredo client behind a restricted NAT communicating with another Teredo client behind another restricted NAT. Other examples could include variations on these two procedures or simplifications of the rules provided above.

Figure 9:
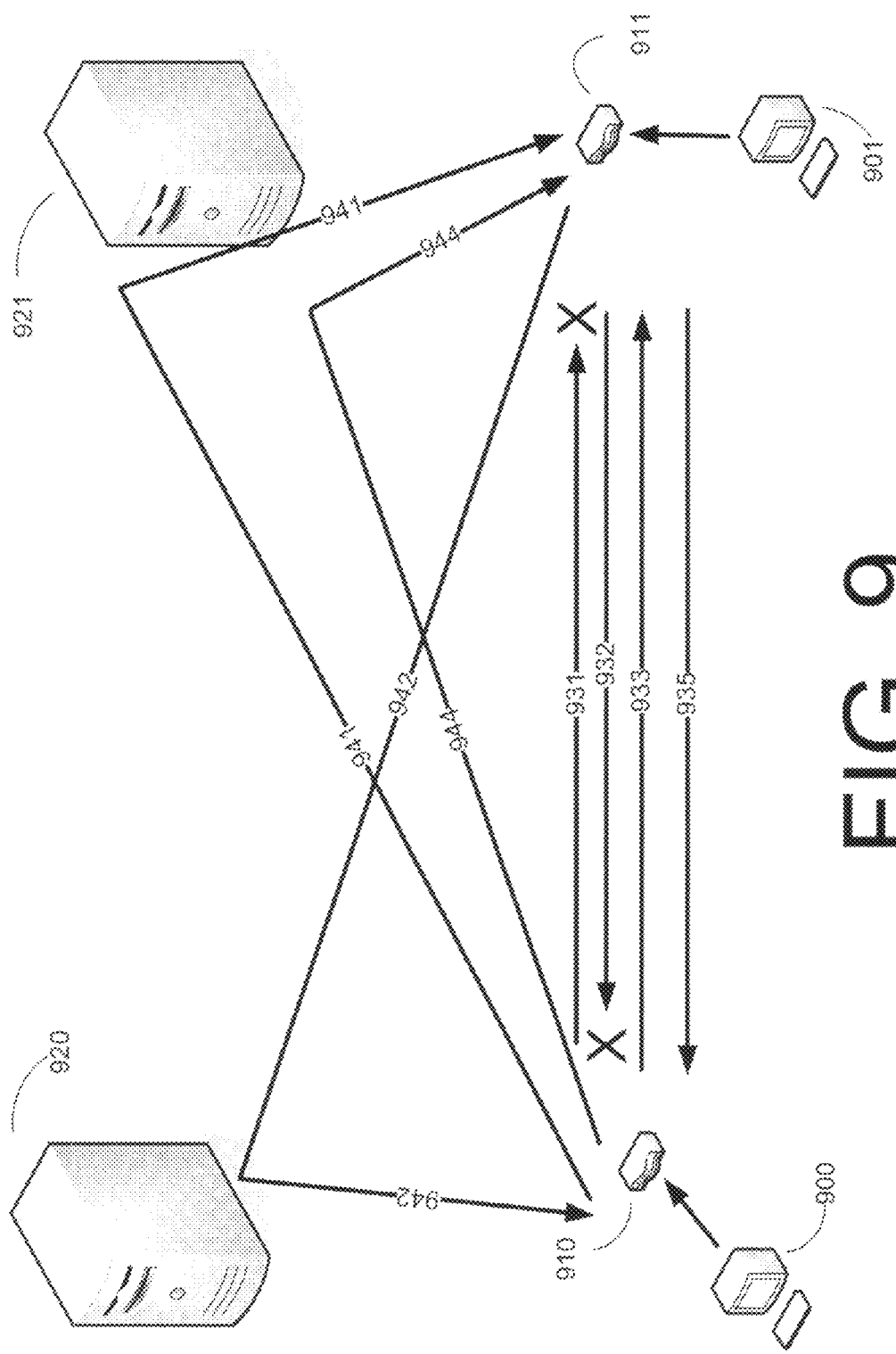
FIG. 9 depicts some aspects of some embodiments of the invention where one Teredo client is behind a port-symmetric NAT and the other client is behind an address-restricted NAT.

Communication Between Teredo Client Behind a Port Symmetric NAT and a Teredo Client Behind an Address Restricted NAT FIG. 9 depicts the first example where one Teredo client 900 is behind a port symmetric NAT 910 and the other Teredo client 901 is behind an address-restricted NAT 911. In this example, the clients are each connected to a different Teredo server. The first client 910 is connected to a first Teredo server 920. The second client 901 is connected to a second Teredo server 921. In both cases the connections are made through each client's respective NAT.

First, a Neighbor Solicitation message is received from the stack on the first client 900 to generate a rate-limited direct bubble 931 and an indirect bubble 941. The indirect bubble 941 carries a new nonce (N1) generated by the first client 900. Since the port mapping on the restricted NAT 911 is not open, the direct bubble 931 is dropped (as indicated by the X), while the indirect bubble 941 is forwarded by the NAT 911 to the second client 901 and is translated into a Neighbor Solicitation message which is sent down that client's stack.

Second, the stack on the second client 901 generates a Neighbor Advertisement message which is translated into a direct bubble 932 and a rate-limited indirect bubble 942. The indirect bubble 942 carries a new nonce (N2) generated by the second client 901. Again, the direct bubble 932 is not forwarded to the internal client by the Symmetric NAT 910 because the second client 901 has only received an indirect bubble 941 from the first client 900 and is thus unable to determine the correct external mapping of the first client 900. The direct bubble 932 does, however, open the port mapping on the restricted NAT 911 to receive future direct bubbles sent by the first client 900 to the second client 901. The indirect bubble 942 is received by the first client 900 as a Neighbor Solicitation message and sent down that client's stack.

Third, the stack on the first client 900 generates a Neighbor Advertisement message in response to the Neighbor Solicitation message received in the indirect bubble 942. The generation of a rate-limited indirect bubble is suppressed as an indirect bubble was already sent out in the previous step (described above). The direct bubble generated 933, however, is forwarded to the second client 901 by the address-restricted NAT 911, since that NAT 911 had previously opened the port mapping when it attempted to send the direct bubble 932 to the first client 900. Moreover, the direct bubble 933 carries the nonce N2 received in the last indirect bubble 942 from the second client 901 thus allowing the second client 901 to verify the identity of the first client 900. The direct bubble 933 received by the second client 901 is translated into a Neighbor Advertisement message and thereafter the first client 900 can be reached from the second client 901.

Fourth, since the second client 901 may still be unreachable from the first client 900, the stack's neighbor discovery mechanism will timeout and generate another Neighbor Solicitation. This Neighbor solicitation results in an indirect bubble 944 that also carries a new nonce N3. The generation of the rate-limited direct bubble is suppressed. The indirect bubble 944 received by the second client 901 is translated into a Neighbor Solicitation message and sent down the stack.

Fifth, the stack on the second client 901 generates a Neighbor Advertisement message which is translated into a direct bubble 935 carrying the nonce N3 received at 944. This direct bubble 935 is forwarded by the symmetric NAT 910 of the first client 900, and after it has been translated into a Neighbor Advertisement message by the first client 900, the second client 901 will then be reachable from the first client 900. Regular IPv6 data communication between the first client 900 and the second client 901 can now commence. Thus, an embodiment has been described to permit communication between these two clients.

Figure 10:
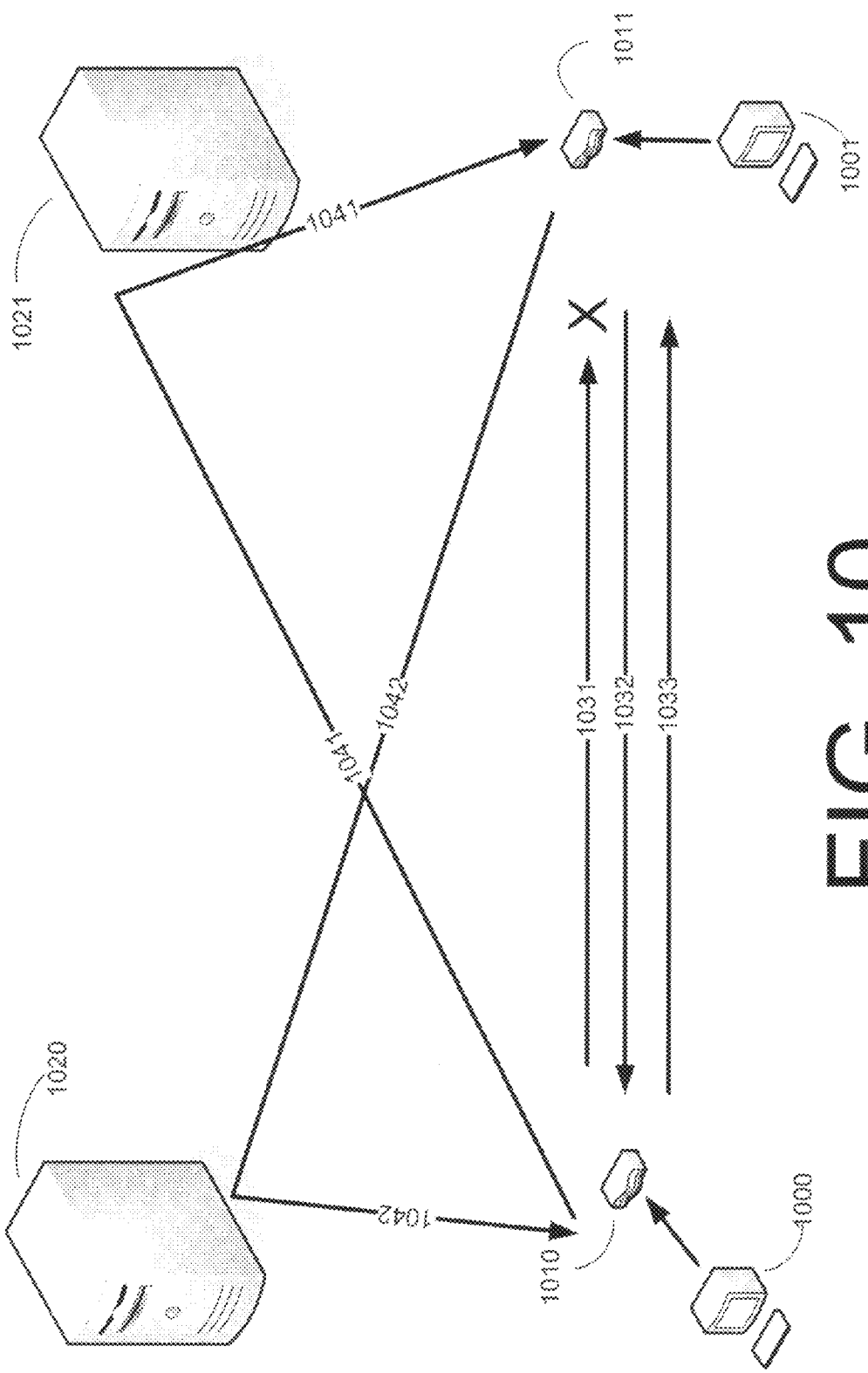
FIG. 10 depicts some aspects of some embodiments of the invention where two Teredo clients are each behind a restricted NAT.

Communication Between Teredo Client Behind a Restricted NAT and a Teredo Client Behind Another Restricted NAT Another embodiment is depicted in FIG. 10. In this embodiment, two Teredo clients 1000 and 1001 are each behind a separate restricted NAT, 1010 and 1011 respectively. The clients are also connected to separate Teredo servers. The first client 1000 is connected to a first Teredo server 1020, while the second client 1001 is connected to a second Teredo server 1021.

First, a direct bubble 1031 and an indirect bubble 1041 are generated by the first client 1000 as described above.

Second, the second client 1001 generates a direct bubble 1032 and a rate-limited indirect bubble 1042 as in the case described above. Since the direct bubble 1031 has opened the port mapping on the restricted NAT 1010 connected to the first client 1000, the direct bubble generated by the second client 1001 is forwarded by the restricted NAT 1010 to the first client 1000, unlike in the case described above where the first client 900 was behind a port symmetric NAT 910. The direct bubble 1032 received by the first client 1000 results in the generation of a Neighbor Advertisement message which is sent down the stack and thus the second client 1001 can be reached by the first client 1000. The indirect bubble 1042 received by the first client 1000 is translated into a Neighbor Solicitation message and also sent down the stack.

Third, the stack on the first client 1000 generates a Neighbor Advertisement message which results in the generation of a direct bubble 1033 that is sent to the second client 1001. Again, the direct bubble 1033 is forwarded by the NAT 1011. After the direct bubble 1033 has been translated to a Neighbor Advertisement message on the second client 1001, the first client 1000 can be reached by the second client 1001.

Figure 11:
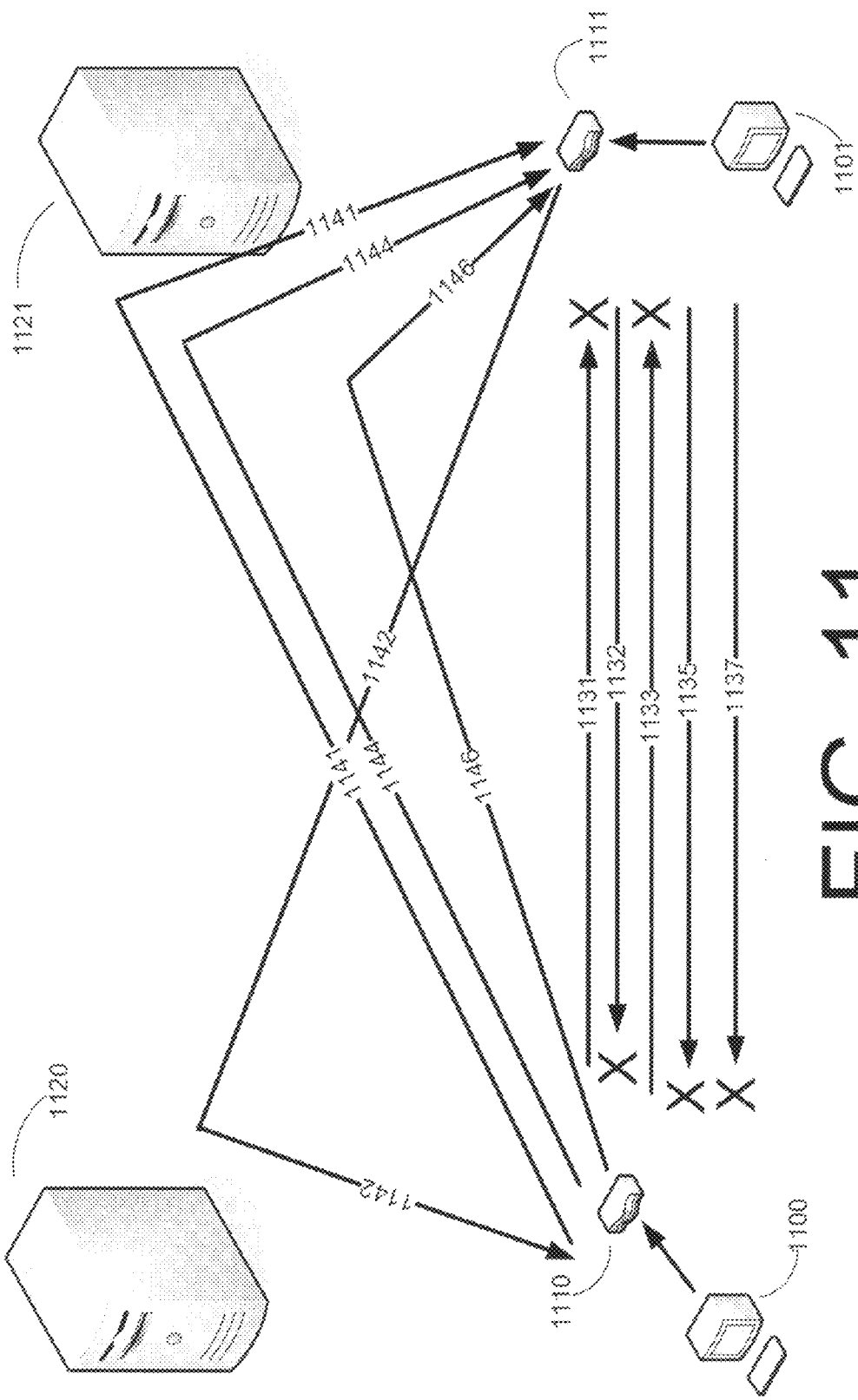
FIG. 11 depicts some aspects of some embodiments of the invention where two Teredo clients are each behind a symmetric NAT.

Attempted Communication Between Teredo Client Behind a Symmetric NAT and a Teredo Client Behind Another Symmetric NAT FIG. 11 depicts an attempted communication in accordance with one embodiment where both Teredo clients are behind symmetric NATs. In this case, the qualification rules described above result in a termination of the process when the nodes are found to be unreachable. (In this example, it is assumed that the symmetric NATS are not UPnP-enabled). The first client 1100 is behind a first symmetric NAT 1110 connected to a first Teredo server 1120. Similarly, the second client 1101 is behind a second symmetric NAT 1111 connected to a second Teredo server 1121.

First, as described above, the first client 1100 generates a direct bubble 1131 and an indirect bubble 1141 in response to a Neighbor Solicitation message from the stack. The direct bubble 1131 is not forwarded by the NAT 1111 of the second client 1101, but the indirect bubble 1141 reaches the second client 1101 and is translated into a Neighbor Solicitation message.

Second, the second client 1101 receives a Neighbor Advertisement message from the stack which, as described above, is translated into a direct bubble 1132 and an indirect bubble 1142. The direct bubble 1131 again is not forwarded by the NAT 1110 of the first client 1100, but the indirect bubble 1141 is forwarded to the first client 1100. This indirect bubble 1141 is translated into a Neighbor Solicitation message.

Third, the first client 1100 generates a direct bubble 1133 in response to the Neighbor Advertisement message received from the stack. Since no port mapping has been opened on the second NAT 1111, however, this direct bubble 1133 is also dropped by the NAT 1111 and not forwarded to the second client 1101.

Fourth, the stack on the first client 1100 times out and generates a Neighbor Solicitation message as it is still attempting to determine the link-layer address of the second client 1101. The rate-limited direct bubble is suppressed and only an indirect bubble is generated 1144. This message again causes no change in status of the port mappings. The indirect bubble 1144 is mapped to a Neighbor Solicitation message by the second client 1101.

Fifth, a direct bubble 1135 is sent to the first client 1100 in response to the Neighbor Advertisement message received from the stack. The direct bubble 1135 is dropped by the NAT 1110 of the first client 1100.

Finally, the stack on the first client 1100 continues to time out as the previous two steps are repeated, until the stack has exhausted all its retransmission attempts. At that point, the client can determine that the external node is unreachable. (As described above, if the NATs are UPnP-enabled, other techniques may be used to facilitate communication.)

Figure 12:
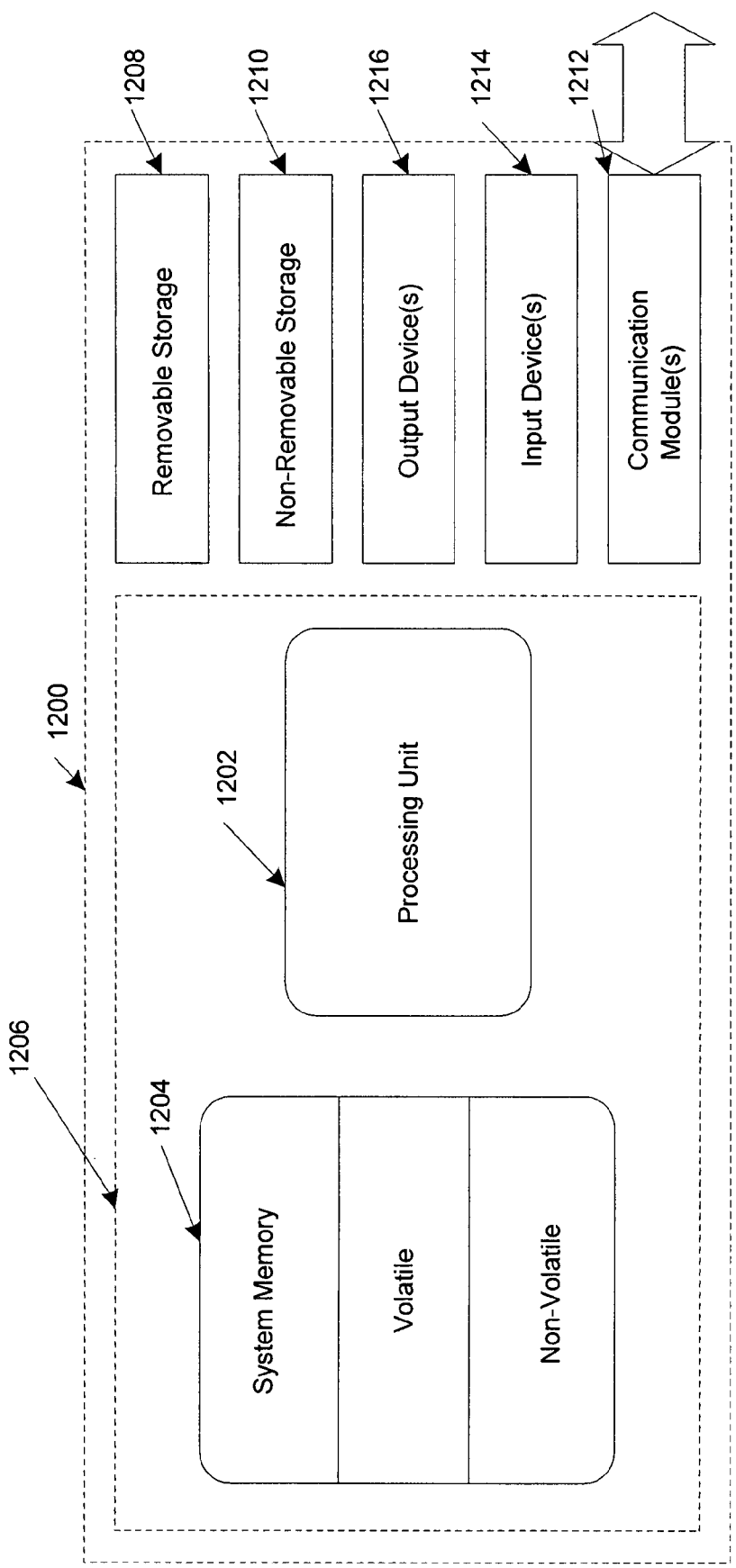
FIG. 12 depicts an exemplary general-purpose computing system in accordance with some embodiments of the invention.

A general-purpose computing system will now be described, on which embodiments of the invention may be implemented. With reference to FIG. 12, an exemplary system for implementing embodiments of the invention includes a computing device, such as computing device 1200, which may be a device suitable to function as a node of network environment. Computing device 1200 may include at least one processing unit 1202 and memory 1204. Depending on the exact configuration and type of computing device, memory 1204 may be volatile (such as RAM), non-volatile (such as ROM, flash memory, etc.) or some combination of the two. This most basic configuration is illustrated in FIG. 12 by dashed line 1206. Additionally, device 1200 may also have additional features/functionality. Memory 1204 is a form of computer-readable media that may store instructions, having wireless medium parameters for various nodes in network environment.

Device 1200 may include at least some form of computer readable media. Computer readable media can be any available media that can be accessed by device 1200. By way of example, and not limitation, computer readable media may comprise computer storage media and communication media. For example, device 1200 may also include additional storage (removable and/or non-removable) including, but not limited to, magnetic or optical disks or tape. Such additional storage is illustrated in FIG. 12 by removable storage 1208 and non-removable storage 1210. Computer storage media includes volatile and nonvolatile, removable and non-removable media implemented in any method or technology for storage of information such as computer readable instructions, data structures, program modules or other data. Memory 1204, removable storage 1208 and non-removable storage 1210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 1200. Any such computer storage media may be part of device 1200.

Device 1200 may also contain communications connection(s) 1212 that allow the device to communicate with other devices. Communications connection(s) 1212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 1200 may also have input device(s) 1214 such as keyboard, mouse, pen, voice input device, touch input device, etc. Output device(s) 1216 such as a display, speakers, printer, etc. may also be included. All these devices are well know in the art and need not be discussed at length here.

It should be appreciated that the invention is not limited to executing on any particular system or group of systems. For example, embodiments of the invention may run on one device or on a combination of devices. Also, it should be appreciated that the invention is not limited to any particular architecture or network.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A method of establishing communication between a first client adapted to communicate with a first Internet Protocol version 6 (IPv6) network and a second client adapted to communicate with a second IPv6 network, the first client and the second client being connected by an Internet Protocol version 4 (IPv4) network comprising a server, the method comprising performing, at the first client, acts of:
    a) determining whether the first client adapted to communicate with the first IPv6 network is connected to the IPv4 network comprising the server via a symmetric Network Address Translator (NAT);
    b) when it is determined that the first client is connected to the IPv4 network via a symmetric NAT, attempting to create a static port mapping for the first client on the symmetric NAT by sending a Universal Plug and Play (UPnP) message to the symmetric NAT requesting that the static port mapping be created;
    c) when the static port mapping for the first client is successfully created on the symmetric NAT in response to the UPnP message:
        i) sending, to the second client via the server, a first packet comprising a nonce, wherein the sending comprises sending the first packet from the first client to the IPv4 network via the symmetric NAT, the first packet indicating a first communication port for the second client;
        ii) receiving, from the second client via the symmetric NAT, a second packet comprising the nonce, the second packet indicating a second communication port for the second client;
        iii) comparing the first communication port and the second communication port;
        iv) when the first communication port and the second communication port are different, sending a third packet to the second client, the third packet indicating the first communication port for the second client; and
        v) when the first communication port and the second communication port are not different, sending the third packet to the second client, the third packet indicating the second communication port for the second client.

2. The method of claim 1, wherein the first packet is a Teredo indirect bubble.

3. The method of claim 1, wherein the first packet comprises a Neighbor Solicitation message.

4. The method of claim 1, wherein the second packet is a Teredo direct bubble.

5. The method of claim 1, wherein the second packet comprises a Neighbor Advertisement message.

6. The method of claim 1, further comprising, by the first client:
    further communicating directly with the second client without sending packets via the server.

7. The method of claim 1, wherein the server is a Teredo server, and wherein both the first client and the second client are communicating with the same Teredo server.

8. The method of claim 1, wherein the server is a Teredo server, and wherein the first client and the second client are communicating with different Teredo servers.

9. The method of claim 1, wherein the nonce is generated by the first client.

10. The method of claim 1, wherein the nonce is a random number.

11. The method of claim 1, further comprising, when the static port mapping for the first client is created on the symmetric NAT successfully:
    vi) receiving, at the first client from the second client, a third packet comprising a second nonce; and
    vii) transmitting, directly to the second client via the IPv4 network and without communicating with the server, a response to the third packet, the response comprising the second nonce.

12. A system comprising:
    a first Teredo client directly connected to a first Internet Protocol version 6 (IPv6) network and connected to an Internet Protocol version 4 (IPv4) network via a symmetric Network Address Translator (NAT), wherein the first Teredo client comprises at least one first storage medium storing a first connection establishment module, the first connection establishment module comprising:
        a first transmission module for transmitting a first packet comprising a first nonce to a destination device via the symmetric NAT and a first server connected to the IPv4 network, transmitting a first response packet comprising a second nonce to the destination device via the symmetric NAT and not via the first server following reception of a third packet from the destination device, and transmitting, following the first response packet, a second packet comprising a third nonce to the destination device via the symmetric NAT and the first server connected to the IPv4 network, and a first reception module for receiving the third packet from the destination device via the symmetric NAT and a second server comprising the second nonce and receiving a second response packet in response to the second packet comprising the third nonce from the destination device to establish a Teredo connection, a second Teredo client directly connected to a second IPv6 network and connected to the IPv4 network via a second Network Address Translator (NAT), wherein the second Teredo client comprises at least one second storage medium storing a second connection establishment module and adapted to:

upon receipt of the first packet, transmit a third response packet to the first Teredo client via the second NAT and not via the first or second servers, transmit the third packet comprising the second nonce via the second NAT and the second server, and upon receipt of the second packet, transmit the second response packet comprising the third nonce via the second NAT and not via the first or second servers.

13. The system of claim 12, wherein the first Teredo client is a general purpose computer.

14. The system of claim 12, wherein the at least one first storage medium of the first Teredo client further stores a cryptographic module for cryptographically generating the first nonce.

15. The system of claim 12, wherein the first server and the second server are a Teredo server.

16. The system of claim 15, wherein the first server and the second server are the same server, and the first Teredo client and the second Teredo client are connected to the same server.

17. The system of claim 12, wherein the symmetric NAT is not a Universal Plug-and-Play (UPnP) NAT.

18. A computer-readable storage medium having computer-readable instructions that, as a result of being executed by a computer, instruct the computer to perform a method of establishing communication between a first client adapted to communicate with a first Internet Protocol version 6 (IPv6) network and a second client adapted to communicate with a second IPv6 network, the first client and the second client being connected by an Internet Protocol version 4 (IPv4) network comprising at least one server, the method comprising:

a) transmitting a first nonce from the first client adapted to communicate with the first IPv6 network to the at least one server of the IPv4 network for communication to the second client of the second IPv6 network, wherein the first client is connected to the IPv4 network via a symmetric Network Address Translator (NAT) and wherein the transmitting of the first nonce comprises transmitting the first nonce from the first client to the IPv4 network via the symmetric NAT; and b) receiving, at the first client and from the second client via the symmetric NAT and the at least one server, a second nonce;

c) transmitting the second nonce from the first client to the second client via the symmetric NAT and not via the at least one server;

d) transmitting a third nonce from the first client to the at least one server for communication to the second client, the transmitting of the third nonce comprising transmitting to the at least one server via the symmetric NAT;

e) receiving a packet from the second client via the symmetric NAT and not via the at least one server; and f) verifying that the packet received from the second client includes the third nonce prior to establishing a Teredo connection between the first client and the second client.

19. The computer-readable storage medium of claim 18, wherein the first nonce is encapsulated in a Teredo bubble.

20. The computer-readable storage medium of claim 18, wherein the at least one server comprises a Teredo server.

* * * * *